(12) United States Patent
Karam

(10) Patent No.: US 6,694,003 B1
(45) Date of Patent: Feb. 17, 2004

(54) METHOD AND APPARATUS FOR PREPAID INBOUND CALL FORWARDING SERVICE

(75) Inventor: Gerald Michael Karam, Morristown, NJ (US)

(73) Assignee: AT&T Corp., New York, NY (US)

( * ) Notice: Subject to any disclaimer, the term of this patent is extended or adjusted under 35 U.S.C. 154(b) by 407 days.

(21) Appl. No.: 09/694,213

(22) Filed: Oct. 23, 2000

Related U.S. Application Data

(60) Provisional application No. 60/160,824, filed on Oct. 21, 1999.

(51) Int. Cl.$^7$ ............................................. H04M 17/100
(52) U.S. Cl. .............................. 379/211.02; 379/114.05; 379/201.01
(58) Field of Search ........................ 379/211.02, 114.05, 379/114.2, 144–145, 189, 191, 196, 197, 142.05, 142.06, 219, 201.01, 201.12, 207.11, 207.13

(56) References Cited

U.S. PATENT DOCUMENTS

| | | | |
|---|---|---|---|
| 6,317,484 B1 | * 11/2001 | McAllister | 379/88.02 |
| 6,327,363 B1 | * 12/2001 | Henderson et al. | 379/265.01 |
| 6,356,630 B1 | * 3/2002 | Cai et al. | 379/144.01 |
| 6,381,316 B2 | * 4/2002 | Joyce et al. | 379/114.2 |
| 6,393,278 B1 | * 5/2002 | Buchanan et al. | 455/426 |

* cited by examiner

*Primary Examiner*—William J. Deane, Jr.

(57) ABSTRACT

A telecommunication service is disclosed which allows customers to prepay a telephone service to allow them to receive inbound calls forwarded anonymously to a destination number. The inbound call routes to a forwarding number using an inbound access number and an access code. The call is routed to a number chosen by the customer or, alternatively, a preset voice announcement can be utilized. Billing for the call can be charged against a prepaid amount, and the service can be sold in the same manner as prepaid calling cards. The forwarding number is advantageously unknown to the caller, thus enabling anonymous phone calling prepaid by the called party. Multiple access codes can be easily provisioned and purchased to permit the called party flexibility in how and when other parties contact the called party. The service is of particular benefit for those wishing to transact business with another party on a short-term basis without the other party knowing the subscriber's long term telephone number.

20 Claims, 1 Drawing Sheet

METHOD AND APPARATUS FOR PREPAID INBOUND CALL FORWARDING SERVICE

CROSS REFERENCE TO RELATED APPLICATIONS

This application claims priority to Provisional Application Serial No. 60/160,824, filed on Oct. 21, 1999, the content of which is incorporated by reference herein.

FIELD OF THE INVENTION

The present invention relates generally to telecommunication services. More particularly, the present invention relates to prepaid calling services and to call forwarding services.

BACKGROUND OF THE INVENTION

It has been long considered desirable to allow subscribers to telecommunication services as much control as possible in the processing of calls, thereby reducing the need for service provider intervention and enhancing the privacy of telephone communications. For example, a known method for enabling a called party to divert calls directed to the party's telephone to another telephone station is usually referred to as call-forwarding. Call forwarding is conventionally implemented in a stored program electronic switching office which stores data identifying the party as a subscriber to the call-forwarding service. Data is also stored at the office indicating if the service is activated and; if so, a directory number to which incoming calls are to be forwarded. When an incoming call is received, the stored program of the office will retrieve the forwarding number from memory if the call-forwarding service is activated and will act, effectively, as an originating office with respect to the new number. That is, the office may complete the call local to the new number if it is served by the office, or it may seize the outgoing truck to another local office or to the toll network, as the situation demands, and outpulse the new number to a distant office to complete the call.

Call-forwarding, while effective at rerouting calls originally bound to a person's home phone number to a number whose location is accessible to a mobile subscriber, does not alone adequately address the issue of the called party's privacy. The called party must distribute the home phone number in order to receive forwarded calls. A clever subscriber could create a phony number that is forwarded to the subscriber's real home phone number, but the subscriber would have to go through the costly process of arranging for the provisioning of the alternative line for each number which the party distributes. Moreover, the subscriber cannot arbitrarily change the alternative line number.

As a separate matter, subscribers have found it convenient to obtain telecommunication services in a prepaid manner rather than through signing up with a specific service provider. Today it is commonly possible for a person to walk into a convenience store and purchase a prepaid telephone card enabling the usage of a telephone service for a preset period of time or units. Such prepaid architectures typically utilize a pre-specified toll free number, such as an 800 number, which the user calls and inputs a security access code in order to access the service. The particular access code is associated with an entry in the service provider's database that keeps track of how much time has been used up by the purchaser/user of the prepaid card. When the time expires, the calling card's access code can no longer be used by the card holder to access the network.

Although prepaid calling card architectures have been utilized to provide traditional point-to-point outbound calling service, they have not been harnessed to provide more complicated and involved telephone services—such as call forwarding. Moreover, prepaid calling has not been utilized to enhance the privacy of a called party.

SUMMARY OF THE INVENTION

A telecommunication service is disclosed which allows customers to prepay a telephone service to allow them to receive inbound calls forwarded anonymously to a destination number. The inbound call routes to a forwarding number using an inbound access number and an access code. The call is routed to a number chosen by the customer or, alternatively, a preset voice announcement can be utilized. Billing for the call can be charged against a prepaid amount, and the service can be sold in the same manner as prepaid calling cards. The forwarding number is advantageously unknown to the caller, thus enabling anonymous phone calling prepaid by the called party. Multiple access codes can be easily provisioned and purchased to permit the called party flexibility in how and when other parties contact the called party. The service is of particular benefit for those wishing to transact business with another party on a short-term basis without the other party knowing the subscriber's long term telephone number.

These and other advantages of the invention will be apparent to those of ordinary skill in the art by reference to the following detailed description and the accompanying drawing.

DETAILED DESCRIPTION

Figure 1:
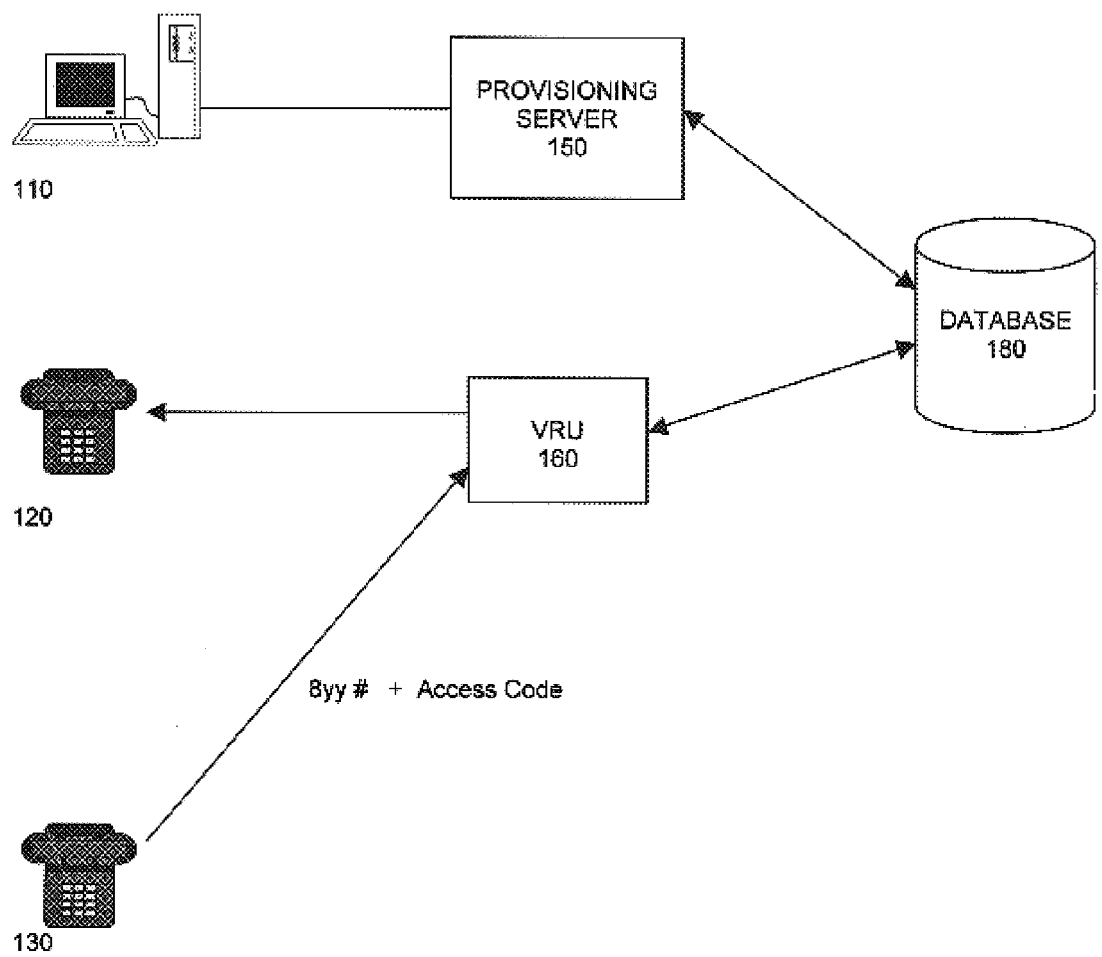
FIG. 1 sets forth a diagram illustrating an embodiment of the present invention.

With reference to FIG. 1, a diagram is shown illustrating a preferred embodiment of the present invention. The telecommunication service comprises, among other elements not shown, a provisioning server 150, a database 180, and a voice response unit (VRU), further described below. The user initiates the service in accordance with one embodiment of the present invention, in FIG. 1, by using a personal computer 110 to access the provisioning server 150. The personal computer 110 can be attached to the provisioning server 150 across a communication network such as the Internet. A suitably user-friendly interface, such as a web browser, can be utilized by the user to provide financial information such as a credit card number to the provisioning server 150 in order to purchase the service. Assuming the proper financial checks are conducted and passed, the provisioning server 150 will issue the user an account number and personal identification number (PIN). This allows the user to identify herself/himself to the system and change options in the future. The provisioning server 150 accesses a network database 180 and stores data associated with the user's account, including the account number, PIN, and credit card information.

In accordance with an embodiment of the present invention, the provisioning server or service provider notifies the user of a toll free number, such as an 8yy or 800 number, which can be shared by many other service account holders. The 8yy/800 number need not be a personal number. The user then can setup one or more access codes for callers who use the toll free number. The user can either choose the access code from available access codes or be randomly assigned an access code as a default by the system. Each access code can be associated by the user with a different forwarding number and/or with different options. For example, the service can give the option for the user to record specific personalized voice announcements for different access codes. The access numbers and associated forwarding numbers and options are also stored in database 180.

Alternatively, the user can purchase the service in a tangible form, e.g. in the same form as a calling card. The calling card, for example, can specify a toll free dial-in number, an account number and PIN code, and a prepaid amount of telephone time, e.g. 30 minutes. The calling card, prior to sale, is pre-provisioned and the associated information stored in database 180. The user can then call into the service (the account management number can be the same toll free number as the number used with the access codes) and set up an access code and default forwarding number after providing the appropriate identification information. Similarly, subsequent account maintenance can be conducted using the toll free number or with the above-mentioned personal computer interface to the provisioning server.

Afterwards, the user can then distribute the toll free number and an access code to another party. That party uses any type of telephone 130 and dials the telephone number, which causes the party to be connected to the VRU 160. The VRU is programmed to accept the access code from the party, for example through DTMF entry or voice recognition. When the caller enters the access code that was provided by the user, the database 180 is consulted and the associated forwarding number retrieved. The call is then transferred to the forwarding number of a telephone 120 specified by the user: home number, work number, cell phone, etc.—and the caller never knows what number is being used to connect the parties. If the forwarding number does not reach the user, a personalized message can be played for the caller and/or the system can accept and record a voice mail from the caller for the user which the user can retrieve at a later time with the account information. When the user does not wish to hear from that particular caller any more, then the user can just cancel the access code. The user can do this, as described above, over the telephone or over the Internet using a personal computer. Once the access code is cancelled, the caller cannot contact the user with the expired access code information.

Some examples of situations in which the present invention can be used advantageously: (1) the user is selling a car or a house, and does not wish to list the user's real home phone number in the newspaper; (2) the user is purchasing a new car, and does not wish to give out a real telephone number to dealers; (3) the user has met someone new, but does not trust the relationship enough to hand over the user's telephone privacy; (4) the user is trying to hire staff, but does not want to permit all applicants to call a real business phone number; (5) the user wishes to purchase products on a web auction service but wants to keep the user's home phone number anonymous; (6) the user is searching for home mortgages (e.g. on the World Wide Web), but does not wish to give out real home or business numbers to potential lenders or brokers.

The service can be implemented in a prepaid manner allowing users to merely sign up and use it immediately. The user, also, can purchase a minute bundle and have the account replenished automatically (by charges to the credit card) so that the service remains always available. Multiple access numbers, e.g. 10, can be activated at any time by a single user permitting the user a great deal of flexibility in configuring how the user receives incoming calls. In a preferred embodiment of the present invention, the VRU 160 and the provisioning server 150 are connected to provide the flexibility and functionality set forth in co-pending, commonly-assigned patent application, "Method and Apparatus for Information Retrieval Using Audio Interface," Benedikt et al., Ser. No. 08/635,801, filed Apr. 22, 1996, the contents of which are incorporated herein by reference.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method of providing a telecommunication service, the method comprising:

receiving a prepaid registration from a customer to use the telecommunication service, the registration enabling the customer to select access codes for use by third parties;

receiving a call from a third party for the customer, the call comprising an inbound access telephone number and the access code selected by the customer; and managing the call from the third party according to the access code.

2. The method of claim 1, wherein managing the call comprises routing the third party call to the customer.

3. The method of claim 1, wherein managing the call comprises routing the third party call to a voice mailbox.

4. The method of claim 1, wherein managing the call comprises presenting a message to the third party.

5. The method of claim 1, wherein receiving a prepaid registration from a customer to use the telecommunication service comprises receiving a web-based registration.

6. The method of claim 1, wherein receiving a prepaid registration from a customer to use the telecommunication service comprises receiving a calling card-based registration.

7. The method of claim 1, wherein the customer can cancel the selected access codes at any time.

8. The method of claim 1, wherein receiving a prepaid registration from a customer comprises the customer purchasing a minute bundle.

9. The method of claim 8, wherein the prepaid registration is automatically renewed via charging a credit card.

10. The method of claim 1, wherein the prepaid registration from the customer enables the customer to utilize multiple access telephone numbers and multiple access codes for use by third parties.

11. A system for providing a telecommunication service, the system comprising a network node performing the steps of:

receiving a prepaid registration from a customer to use the telecommunication service, the registration enabling the customer to select access codes for use by third parties;

receiving a call from a third party for the customer, the call comprising an inbound access telephone number and the access code selected by the customer; and managing the call from the third party according to the access code.

12. The system of claim 11, wherein managing the call comprises routing the third party call to the customer.

13. The system of claim 11, wherein managing the call comprises routing the third party call to a voice mailbox.

14. The system of claim 11, wherein managing the call comprises presenting a message to the third party.

15. The system of claim 11, wherein receiving a prepaid registration from a customer to use the telecommunication service comprises receiving a web-based registration.

16. The system of claim 11, wherein receiving a prepaid registration from a customer to use the telecommunication service comprises receiving a calling card-based registration.

17. The stem of claim 11, wherein the customer can cancel the selected access codes at any time.

18. The system of claim 11, wherein receiving a prepaid registration from a customer comprises the customer purchasing a minute bundle.

19. The system of claim 18, wherein the prepaid registration is automatically renewed via charging a credit card.

20. The system of claim 11, wherein the prepaid registration from the customer enables the customer to utilize multiple access telephone numbers and multiple access codes for use by third parties.

* * * * *